T. J. McKALIP.
Coffee-Pots.
No. 153,590.
Patented July 28, 1874.
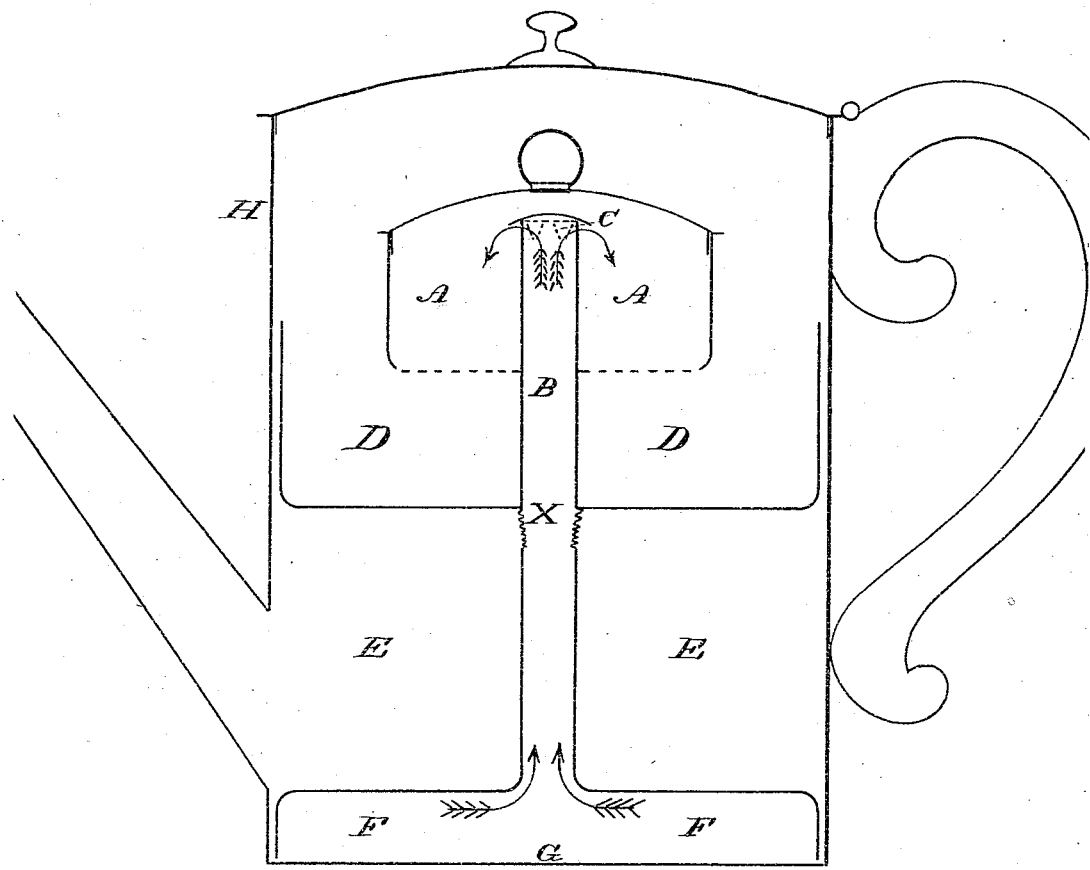

UNITED STATES PATENT OFFICE.

THOMAS J. McKALIP, OF ERIE, PENNSYLVANIA, ASSIGNOR OF TWO-THIRDS HIS RIGHT TO LEONARD G. CHURCH AND JOSEPH H. PRESSLEY, JR., OF SAME PLACE.

IMPROVEMENT IN COFFEE-POTS.

Specification forming part of Letters Patent No. 153,590, dated July 28, 1874; application filed June 15, 1874.

*To all whom it may concern:*

Be it known that I, THOMAS J. McKALIP, of Erie, in the county of Erie and State of Pennsylvania, have invented a new and Improved Coffee-Pot, of which the following is a specification:

My invention consists in a boiling or steaming device to be used within a common coffee-pot, by which the essential part of the coffee (or other substance) is extracted more perfectly, and without the grounds becoming in any way mixed with the fluid, thus obviating the necessity of straining or otherwise clarifying.

My invention is illustrated in the accompanying drawing by a single figure; and the following is a full, clear, and exact description of the same.

H represents an ordinary coffee-pot, in which I place my device, which is composed of the following parts: F is the base-chamber. B is a tube leading from the base-chamber to the steeping-chamber A. D is a receptacle for the essence which runs from the steeping-chamber, and it also acts as a condensing-chamber. The base-chamber connects with the chamber E of the coffee-pot through perforations in its sides near the bottom. This allows the water to pass freely from the chamber E to the chamber F. The chamber F communicates with the chamber A through the tube B and openings C, as indicated by the arrows. The chamber A, which has a tight-fitting cover, communicates with the condensing-chamber D through its finely-perforated bottom.

The operation of my device is as follows: The ground coffee is placed in the chamber A, and its lid is tightly closed. The coffee-pot is then sufficiently filled with water to fill the chamber E, and a small quantity of cold water is then placed in the condensing-chamber D; and the device is then placed in the pot, as seen in the figure. The water in the chamber F very soon becomes heated, and as it attempts to rise it is compelled to pass up the tube B, whence it falls into the ground coffee in the chamber A, and filters through it and falls into the chamber D. By the time the water from chamber F has been forced up the tube B it has become very hot, and as the perforations through the sides of the chamber F are small and admit the water slowly it becomes pretty much converted into steam before it reaches the coffee. This causes the coffee to become thoroughly steeped or steamed, and as the essence passes into the chamber D—which is many degrees cooler than the chamber F—it is at once condensed. By having the chamber D nearly as large as the chamber E none of the essence escapes into the water until the steeping is about completed. When the steeping is concluded the part A is removed, which is done by disjointing the tube B at the screw X. This allows the contents of the chamber D to re-enter the chambers F and E, and then the remainder of the device can be removed, and such a quantity of hot water can be added to the contents of the pot as is necessary to reduce the essence to the desired dilution.

What I claim as new is as follows:

The part A, with the tube B disjointing at X, in combination with the parts D and F, as shown, and for the purposes mentioned.

THOMAS J. McKALIP.

Attest:
L. G. CHURCH,
JNO. K. HALLOCK.